United States Patent [19]

Mullins et al.

[11] Patent Number: 4,994,533

[45] Date of Patent: Feb. 19, 1991

[54] POLY(ARYL ETHER)-POLY(ARYL CARBONATE) BLOCK COPOLYMERS AND THEIR PREPARATION

[75] Inventors: Michael J. Mullins; Steven P. Crain; Edmund P. Woo; Daniel J. Murray; Stephen E. Bales, all of Midland, Mich.

[73] Assignee: The Dow Chemical Company, Midland, Mich.

[21] Appl. No.: 329,802

[22] Filed: Mar. 28, 1989

Related U.S. Application Data

[62] Division of Ser. No. 186,997, Apr. 27, 1988, Pat. No. 4,880,884.

[51] Int. Cl.$^5$ .................. C08G 64/42; C08G 64/18; C08G 64/08
[52] U.S. Cl. .................................. 525/469; 525/462; 528/204
[58] Field of Search .................. 525/462, 469; 528/204

[56] References Cited

U.S. PATENT DOCUMENTS

| | | | |
|---|---|---|---|
| 3,106,544 | 10/1963 | Laakso et al. | 525/469 |
| 3,554,742 | 7/1971 | Gramza et al. | 525/466 |
| 3,641,200 | 2/1972 | Matzner | 525/462 |
| 4,134,936 | 1/1979 | Byrne et al. | 528/201 |
| 4,436,839 | 3/1984 | Behnke et al. | 521/64 |
| 4,463,132 | 7/1984 | Tyrell et al. | 525/92 |
| 4,563,516 | 1/1986 | Schreckenberg et al. | 525/469 |
| 4,594,404 | 6/1986 | Kawakami et al. | 525/462 |
| 4,607,070 | 8/1986 | Schreckenberg et al. | 525/469 |
| 4,645,806 | 2/1987 | Freitag et al. | 525/462 |
| 4,665,122 | 5/1987 | Robeson et al. | 525/66 |

FOREIGN PATENT DOCUMENTS 0091851 3/1983 European Pat. Off. .
257422 3/1987 Japan .

OTHER PUBLICATIONS

McGrath et al., Bisphenol-A-Polycarbonate-Bisphenol-A-Polysulfone Ether Block Copolymers, *Polymer Engineering & Science*, vol. 17, No. 8, 647–651 (Aug. 1977).

McGrath et al., Homogeneous and Microheterogeneous Block Copolymers, *Journal of Polymer Science;* Polymer Symposium 60, 29–46 (1977).

Johnson et al., Poly(Aryl Ethers) by Nucleophilic Aromatic Substitution. I. Synthesis and Properties, *Journal of Polymer Science*, Part A-1, vol. 5, 2375–2398 (1967).

Ward et al., Poly(Arylene Ether Sulfone)–Poly(Aryl Carbonate) Block Copolymers, *Adv. in Chem. Series* 176, 293–311 (1978).

Jost et al., Thermolyse Des Carbonates D'Aryle Initiee Par Les Bases: I–Mecanisme Par Snar Dans Le Cas Des Carbonates D'Aryle Porteurs De Groupes Electro-Attracteurs Identiques, *Tetrahedron Letters*, vol. 23, No. 42, pp. 4311–4314, Pergamon Press Ltd. (1982).

*Primary Examiner*—John C. Bleutge
*Assistant Examiner*—David Buttner

[57] ABSTRACT

A method for preparing novel poly(aryl ether)-(poly aryl carbonate) block copolymers by the decarboxylation of copolycarbonates prepared by the condensation of two different aromatic dihydroxy compounds and a carbonate precursor such as phosgene. At least one of the aromatic diols must have at least one electron-withdrawing group located in a position ortho or para to at least one of its hydroxy groups and at least one of the diols must not have any electron-withdrawing groups in a position ortho or para to either of its hydroxy groups. The method is particularly effective in making crystalline block copolymers.

29 Claims, No Drawings

＃ POLY(ARYL ETHER)-POLY(ARYL CARBONATE) BLOCK COPOLYMERS AND THEIR PREPARATION

This is a divisional of application Ser. No. 07/186,997, filed Apr. 27, 1988 now U.S. Pat. No. 4,880,884.

BACKGROUND OF THE INVENTION

This invention relates to polyether-polycarbonate copolymers More particularly, the invention relates to poly(aryl ether)-poly(aryl carbonate) block copolymers and to the preparation of such block copolymers Polycarbonates are well-known commercially available resinous materials having a variety of applications. They are typically prepared by the reaction of dihydroxy compounds and a carbonate precursor, such as phosgene. The polycarbonates are high temperature, high performance thermoplastic engineering polymers with a good combination of thermal and mechanical properties, especially when the polymer is prepared from one or more aromatic diols. However, the polycarbonates do exhibit poor hydrolytic stability, particularly when exposed to humid environments for prolonged times and/or elevated temperatures and poor solvent resistance.

Attempts to modify the properties of polycarbonate resins by blending with other polymeric materials are quite often unsatisfactory because of the incompatibility of the polycarbonates with other resinous materials. To overcome these problems, it has been proposed to polymerize other resinous materials into the polycarbonate molecule Thus, random, block and graft copolymers of polycarbonates and other polymers, such as polyethers, are known. For example, polyether sulfone has been interpolymerized into the polycarbonate molecule by (1) preparing a hydroxyl-terminated polyether sulfone and condensing the hydroxyl-terminated polysulfone oligomer with 2,2-bis-(4-hydroxyphenyl)propane (Bisphenol A) and phosgene in the presence of pyridine; (2) preforming both a hydroxyl-terminated polyether sulfone oligomer and a Bisphenol A-polycarbonate oligomer and extending the oligomers to a high molecular weight by phosgenation in a common solvent; and (3) by the pyridine-catalyzed reaction of chloroformate-terminated polycarbonate oligomers with hydroxyl-terminated polyether sulfone oligomers in a common solvent In each of these methods, a carbonate radical is linking the polycarbonate and polyether sulfone blocks.

SUMMARY OF THE INVENTION

The present invention comprises a novel class of poly(aryl ether)-poly(aryl carbonate) block copolymers wherein at least some of the poly(aryl ether) blocks are joined to the poly(aryl carbonate) blocks through an ether oxygen atom. The novel poly(aryl ether)-poly(aryl carbonate) block copolymers of the invention are surprisingly prepared by the decarboxylation of either random or ordered copolycarbonates which contain units having the structures

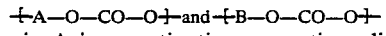

wherein A is an activating aromatic radical having at least one electron-withdrawing group located in a position ortho or para to its carbonate linking group; and B is a nonactivating aromatic radical which is characterized by the absence of an electron-withdrawing group located in a position ortho or para to its carbonate linking group.

DESCRIPTION OF THE PREFERRED EMBODIMENT

In accordance with the present invention, poly(aryl ether)-poly(aryl carbonate) block copolymers are prepared by the decarboxylation of copolycarbonates formed from the reaction of at least two different aromatic dihydroxy compounds and at least one carbonate precursor, such as phosgene, wherein at least one of the aromatic diols (the aromatic portion of which is identified as an "A" group herein) contains an electron-withdrawing group in a position ortho or para, preferably para, with respect to at least one of the hydroxy groups on such diol, and wherein the other of the aromatic diols (the aromatic portion of which is identified as a "B" group herein) does not contain an electron-withdrawing group located in a position ortho or para with respect to any of its hydroxyl groups. The "A" aromatic units are referred to herein as activated, and the "B" aromatic units are said to be nonactivated Such copolymerization of two or more different aromatic diols in the presence of a carbonate precursor will result in a carbonate copolymer, which may have a random or ordered structure depending upon polymerization procedure and conditions and which contains units represented by the formulae

[ A—O—CO—O ] and [ B—O—CO—O ]

The term "ordered structure" is intended to include either a simple alternating structure (ignoring the O—CO—O linkage):

[A—B—A—B—A—B]$_n$; or a block copolymer such as:

[A—A—A—B—B—B]$_n$

Such a copolycarbonate will contain carbonate linkages of three different decarboxylation activities. Carbonate linkages between two activated aromatic radicals 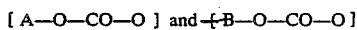 will be most active and will decarboxylate to —A—O—A— segments most rapidly. Carbonate linkages between an activated aromatic linkage and a nonactivated linkage 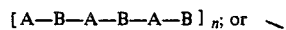 will be less active, but will still be subject to decarboxylation and will be substantially completely decarboxylated if decarboxylation is continued long enough. The carbonate linkages between two nonactivated aromatic groups 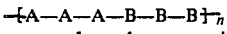 will be highly resistant to decarboxylation at the same conditions and will decarboxylate to an insignificant degree, if at all.

Our experience reveals that even when one decarboxylates an alternating copolycarbonate as described above, one obtains a block poly(aryl ether)-poly(aryl carbonate) This is strikingly surprising While this invention should not be limited to a particular theory, it is believed that the rapidly decarboxylating "A-carbonate" radicals tend to combine with one another to form ether block segments while "B-carbonate" radicals liberated from A-B combinations tend to combine with other B-carbonate units or segments of units. In order to obtain block segments of meaningful lengths, e.g., from about 5 to about 15 units, it has been found preferable to continue decarboxylation until the decarboxylation of A-carbonate units approaches 100%. Further, in order to obtain meaningful poly(aryl ether) segment lengths, the activated aromatic carbonate units should preferably comprise at least about 20% of the copolycarbonate chain. The most interesting poly(aryl ether)-poly(aryl carbonate) block copolymers tend to be made from copolycarbonates having from about 20 to about 80% activated aromatic carbonate units, thereby yielding poly(aryl ether)-poly(aryl carbonate) block copolymers having from about 20 to about 80% poly(aryl ether) units.

We have found that the length of the poly(aryl ether) segments tends to be from about 5 to about 15 units. This length is determined not only by the percentage of activated aromatic carbonate in the starting copolycarbonate, but also by the difference in the decarboxylation rate of the —A—O—CO—O—A— linked groups and the —A—O—CO—O—B carbonate groups. The greater the rate difference, the greater the length of the poly(aryl ether) block segments.

In the decarboxylation of a copolycarbonate comprising 50% activated aromatic carbonate units and 50% nonactivated aromatic carbonate units, the length of the poly(aryl carbonate) block segments will be approximately the same as the length of the poly(aryl ether) block segments. If the percentage of nonactivated aromatic carbonate units is greater, then the length of the poly(aryl carbonate) block segments will be correspondingly longer. In other words, the relative lengths of the poly(aryl ether) and poly(aryl carbonate) segments tends to be proportional to the percentages of their respective precursors in the copolycarbonate.

The novel poly(aryl ether)-poly(aryl carbonate) block copolymers of this invention comprise a first segment having recurring units of the structure

and a second segment having recurring units of the structure

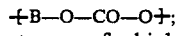;

at least some of which segments are linked to each other through an ether oxygen to form poly(aryl ether)-poly(aryl carbonate) block copolymers which can be characterized in a general way as having recurring units of the structure

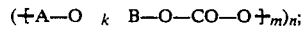

wherein A and B are as previously described, k represents the number of recurring poly(aryl ether) units in the poly(aryl ether) block, m represents the number of recurring units in the poly(aryl carbonate) blocks and n represents the overall degree of polymerization. The k and m values are proportional to the respective percentages of activated aryl carbonate units and nonactivated aryl carbonate units in the starting copolycarbonate.

The foregoing general formula does ignore the fact that there may be a percentage of —A—O—CO—O— units left in the block copolymer chain In order to obtain longer chain lengths, this percentage will be quite small.

The above general formula also assumes that half of the linkages between poly(aryl ether) segments and poly(aryl carbonate) segments will be ether linkages, and the remainder will be carbonate linkages. This in fact may not be the case, depending on how long the operator allows decarboxylation to continue Thus, a more precise structural formula would be as follows:

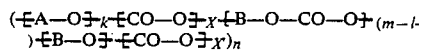

where X is less than and never equals 1 and X' is from 0 to 1.

In the foregoing formula, X and X' can both be substantially reduced, and perhaps even brought to zero by continuing decarboxylation for a sufficient length of time. Almost certainly, at least some of the poly(aryl ether) segments will be bonded to adjacent poly(aryl carbonate) segments through an ether bond, resulting in the statement in the above formula that X is less than, and never equals, one. If X were zero and X' were one, then the more general formula for the polymer set forth above would result.

In less preferred embodiments of the invention, as little as about 20% of the activated aromatic carbonate linkages are decarboxylated. This leaves a significant portion of activated aromatic carbonate units in the polymer chain. The presence of these units tends to cause the individual poly(aryl ether) block segments to be relatively small before being interrupted either by activated aromatic carbonate units or nonactivated aromatic carbonate units. If the degree of decarboxylation is too slight, the product retains too many of the characteristics of the copolycarbonate from which it is made. Further, the degree of decarboxylation necessary to effect a change in properties will vary depending on what percentage of the copolycarbonate is comprised of activated aromatic carbonate units. It has been found that the overall degree of decarboxylation, with reference to both activated and nonactivated aromatic carbonate units, should be at least about 15% in order to begin effecting a significantly noticeable change in properties. In a 50/50 copolycarbonate, 10% decarboxylation overall will comprise 20% decarboxylation of the activated aromatic carbonate linkages. On the other hand, in a 20/80 activated-nonactivated copolycarbonate, 10% decarboxylation as a whole comprises 50% decarboxylation of the activated aromatic carbonate units. Thus, when discussing the degree of decarboxylation necessary to begin effecting a change in properties, it is best to refer to decarboxylation of the copolycarbonate as a whole, even though the nonactivated aromatic carbonate units cannot actually be decarboxylated.

A general formula which reflects the possibility of nondecarboxylated activated aromatic carbonate units is as follows:

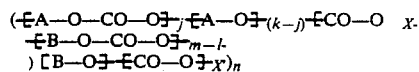

where $(k-j)$ is at least 10% of $k+m$.

It will be appreciated that the above formula is inherently somewhat imprecise in that the 13 A—O—CO—O— units may or may not form a block segment of their own, and indeed are more likely to be randomly interspersed between —A—O— units, between —A—O— and B—CO—O units, and probably between B—O—CO—)— units, to the extent that they were located between such B—O—CO—O— units in the starting copolycarbonate.

Substantially any aromatic diol can be employed in forming the copolycarbonates which are decarboxylated to polymeric poly(aryl ether)-poly(aryl carbonate) blocks in accordance with this invention, providing that at least one of the aromatic diols has at least one electron-withdrawing group which is positioned ortho or para with respect to at least one hydroxy group of the aromatic diol and at least one other and different aromatic diol is present which does not have an electron-withdrawing group positioned ortho or para with respect to either of its hydroxy groups. Electron-withdrawing groups can be, without limitation to those specifically recited, divalent groups such as —$SO_2$—, —SO—, —CO—, —CONH—, —CONR—, —$^+$N$R_2$—, 13 $^+$P$R_2$—, —$^+$SR—, —P(O)R—, —$C(CF_3)_2$—, —CHCH—, —NN—, —CHNNCH—, wherein each R is a $C_1$-$C_{12}$ hydrocarbyl radical; and monovalent groups such as —CN, —$NO_2$, —CHO, —$CO_2R$, —$CO_2NH_2$, —P(O)(OR)$_2$, —P( )$R_2$, —$^+$P$R_3$, —$^+$N$R_3$, $^+$S$R_2$, wherein R again is a $C_1$-$C_{12}$ hydrocarbyl radical. Also functioning as an electron-withdrawing divalent group are heterocyclic compounds such as imidazoles, oxazoles, pyrazoles, isoxazoles and oxapyrazoles.

Some specific examples of suitable aromatic diols containing electron withdrawing groups which are properly positioned are shown below:

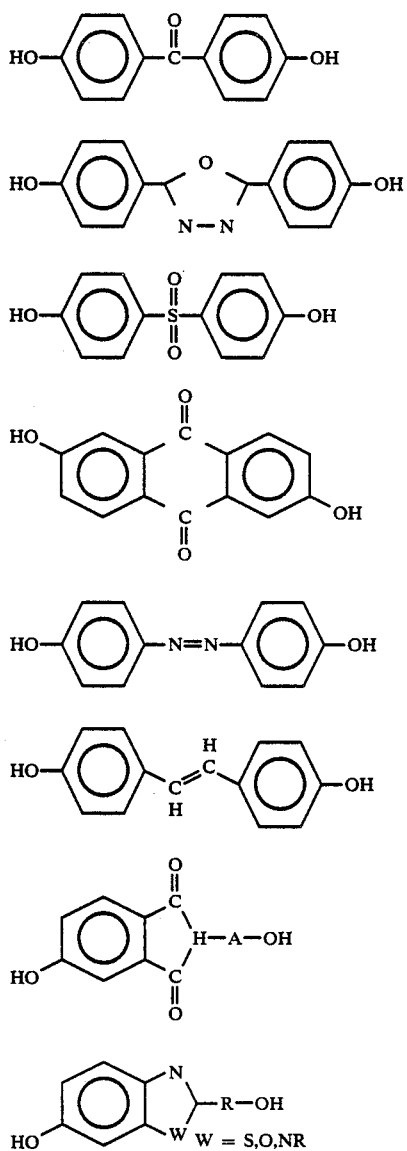

The polycarbonates which are derived at least in part from 4,4'-dihydroxybenzophenone (Bisphenol K) are particularly desirable starting materials because of the crystalline nature of the products containing such residues.

The polycarbonates which are decarboxylated in accordance with this invention can be produced by any of the conventional processes known in the art for the manufacture of polycarbonates. Generally speaking, aromatic carbonate polymers are prepared by reacting an aromatic dihydric phenol with a carbonate precursor such as phosgene, a haloformate or a carbonate ester. The dihydric phenols are mononuclear or polynuclear aromatic compounds containing two hydroxy groups, each of which is attached directly to a carbon atom of an aromatic nucleus In forming the copolycarbonates which are decarboxylated in accordance with the invention, there will be employed at least one activated dihydric phenol, that is, a dihydric phenol which contains at least one electron-withdrawing group in an ortho or para position to either or both of the hydroxy groups, for example, Bisphenol K, and at least one nonactivated dihydric phenol, that is, a dihydric phenol which does not contain an electron-withdrawing group in an ortho or para position to either of the hydroxyl groups, for example, Bisphenol A.

A preferred method for preparing the copolycarbonates suitable for use in the practice of this invention involves the use of a carbonyl halide, such as phosgene, as the carbonate precursor. This method involves passing phosgene gas into a reaction mixture containing the activated dihydric phenol, the nonactivated dihydric phenol and an acid acceptor, such as a tertiary amine, for example, pyridine, dimethyl analine, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C to about 100°C. The reaction proceeds satisfactorily at temperatures from room temperature 20° C to 50° C. Since the reaction is exothermic, the rate of phosgene addition may be used to control the temperature of the reaction. The amount of phosgene required will generally depend upon the amount of dihydric phenols present. Generally speaking, one mole of phosgene will react with one mole of dihydric phenol to form the copolycarbonate and two moles of HCl. The HCl is in turn attacked or taken up by the acid acceptor present. The foregoing are herein referred to as stoichiometric or theoretic amounts.

Another method for preparing the carbonate polymer comprises adding phosgene to an alkaline aqueous suspension of the mixture of activated and nonactivated dihydric phenols. This is preferably done in the presence of inert solvents such as methylene chloride 1,2-dichloroethane and the like. Quaternary ammonium compounds may be employed to catalyze the reaction.

Yet another method for preparing such carbonate copolymers involves the phosgenation of an agitated suspension of the anhydrous alkali salts of the activated and nonactivated diols in a nonaqueous medium such as benzene, chlorobenzene and toluene. The reaction is illustrated by the addition of phosgene to a slurry of the sodium salts of Bisphenol A and Bisphenol K in an inert polymer solvent such as chlorobenzene. The organic solvents should preferably be a polymer solvent but need not necessarily be a good solvent for the reactants.

Generally speaking, a haloformate such as the bishaloformate of Bisphenol A may be substituted for phosgene as the carbonate precursor in any of the methods described above.

When a carbonate ester is used as the carbonate precursor in the polymer forming reaction, the materials are reacted at temperatures of from 100° C or higher for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer forming reaction may be conducted in the absence of a catalyst, one may, if desired, employ the usual ester exchange catalyst, such as metallic lithium, potassium, calcium and magnesium. Additional catalysts in variation in the exchange methods are discussed in Grogans, Unit Porcesses and Organic Synthesis, (4th Edition, McGraw-Hill Book Company 19, 1952), pages 616–20. The amount of such catalyst, if used, is usually small, ranging from about 0.001 to about 0.1%, based on the moles of the dihydric phenols employed.

The carbonate ester useful in this connection may be aliphatic or aromatic in nature, although aromatic esters such as diphenyl carbonate are preferred. Additional samples of carbonate esters which may be used are dimethyl carbonate, diethyl carbonate, phenyl methyl carbonate, phenyl tolyl carbonate and di(tolyl) carbonate.

In the solution methods of preparation, the carbonate copolymer emerges from the reaction in either a true or pseudo solution whether aqueous base or pyridine is used as an acid acceptor. The copolymer may be precipitated from the solution by adding a polymer nonsolvent, such as heptane or isopropanol. Alternatively, the polymer solution may be heated to evaporate the solvent.

Another method for preparing the copolycarbonate resins which are decarboxylated in accordance with the invention comprises passing a carbonyl halide such as phosgene into a slurry comprising a suspension of solid particles in a single liquid phase, the suspension of solid particles comprising a mixture of activated and nonactivated dihydric phenols and at least two moles, per mole of dihydric phenol, of at least one acid selector selected from the group consisting of a hydroxide, a carbonate and a phosphate of an alkali or alkaline earth metal and a single liquid phase comprising an inert organic liquid which is a solvent for the carbonate copolymer, but a nonsolvent for the dihydric phenols and the acid acceptor, to form a reaction mixture having a solid phase and a single liquid phase comprising a solution of the copolycarbonate polymeric material in the inert organic liquid, and separating the liquid phase from the solid phase.

The decarboxylation of the copolycarbonates to form the novel polymeric products containing poly(aryl ether)-poly(aryl carbonate) blocks or segments is carried out by heating the copolycarbonate, preferably in the presence of a high boiling solvent and a catalyst, and more preferably, also in the presence of a dehydrating or azeotroping agent. The decarboxylation is effected at temperatures in the range from 150° to 350° C, preferably 230° to 350° C, and most preferably from 250° to 350° C. The pressure at which decarboxylation is effected is not critical and thus can be over a broad range from superatmospheric to subatmospheric. The use of catalysts is recommended, particularly metal salts such as alkaline metal halides, carbonates, phenates, acetates and alcoholates. Currently, the metal halides, particularly the metal fluorides such as cesium fluoride, are preferred. It has been found that the metal halide catalysts, especially the metal fluorides, provide a significant advantage over oxygen-containing catalysts, such as phenates and carbonates, in that their use does not lead to a loss of molecular weight in the final decarboxylated product. The currently preferred decarboxylation catalyst is cesium fluoride. The catalysts are employed in amounts in the range from 0.001 to 10, preferably 0.01 to 2, and most preferably 0.1 to 0.5, percent by weight, relative to the copolycarbonate amount. It can be advantageous, although it is not a requirement, to conduct decarboxylation in the presence of high boiling solvents such as benzophenone and diphenylsulfone and dehydrating agents, e.g., azeotroping agents, such as toluene or chlorobenzene. In a particularly preferred embodiment, the polycarbonate and high-boiling solvent are combined with an azeotroping agent such as chlorobenzene to dewater the copolycarbonate before combining the copolycarbonate with the catalyst. As noted above, the degree of decarboxylation is at least 10% with respect to the total carbonate content of the copolycarbonate.

The invention is more easily understood by reference to a specific embodiment which is representative of the invention, it being understood that the specific embodiment is provided for purposes of illustration and understanding of the invention and that the invention is not limited to the recited embodiment. However, this specific embodiment does yield a surprisingly- desirable block copolymer.

In accordance with the present invention, novel poly(benzophenone ether)-poly[2,2-bis(4-hydroxyphenyl)propane carbonate] block copolymer is obtained by the decarboxylation of the corresponding copolycarbonate according to the following reaction scheme, which is shown in a general way:

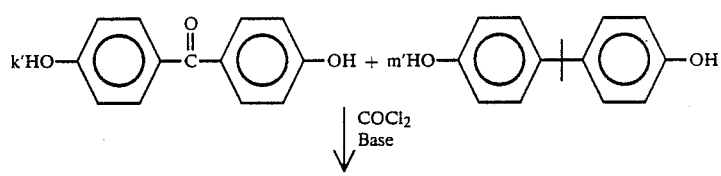

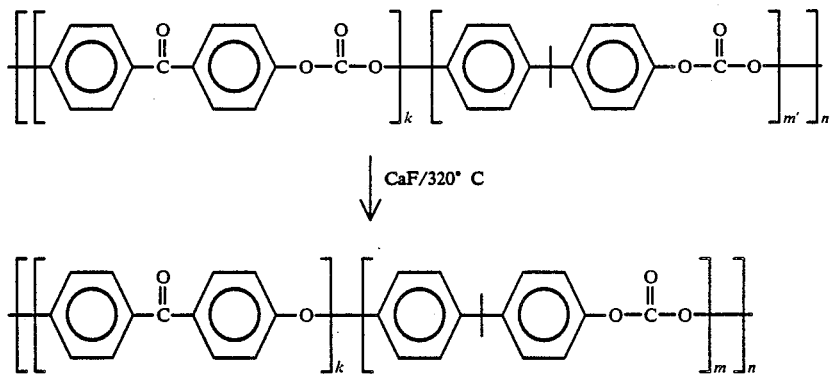

where k and m are numbers proportional to k' and m', respectively.

Thus, 4,4'-dihydroxybenzophenone (Bisphenol K), 2,2-bis(4-hydroxyphenyl)propane (Bisphenol A) and carbonyl chloride are reacted to form a copolycarbonate which can be ordered or random, depending on procedure followed. The benzophenone carbonate, i.e., Bisphenol K carbonate, units are activated and the Bisphenol A carbonate segments are nonactivated.

In the representative reaction in which Bisphenol K and Bisphenol A are reacted in the presence of carbonyl chloride to form a copolycarbonate, the activation is accomplished by the carbonyl group from the Bisphenol K which is in a para position with respect to both hydroxy groups of the Bisphenol K compound. While electron-withdrawing groups in either the ortho or para position are effective to activate the polycarbonate for decarboxylation, aromatic diols containing at least one electron-withdrawing group in a para position to at least one of the hydroxyl groups of the aromatic diol are currently preferred.

The foregoing poly(Bisphenol K ether) poly (Bisphenol A carbonate) copolymer is a particularly preferred embodiment of this invention in that it exhibits both the high temperature, high performance thermoplastic engineering properties of polycarbonates, as well as excellent solvent resistance resulting from the fact that surprisingly, this copolymer is crystalline in structure. This surprising crystalline structure is a particularly desirable result.

EXAMPLES

In Example 1 below, a random 50% Bisphenol A/50% Bisphenol K copolycarbonate is produced and subsequently decarboxylated in accordance with the method of the present invention. In Example 2, an ordered, alternating 50% Bisphenol A/50% Bisphenol K copolycarbonate was made. Both were then subjected to the same analysis in Example 3 to compare the resulting block copolymer structures. In Example 3, the poly(Bisphenol K ether) poly(Bisphenol A carbonate) from each of Examples 1 and 2 was subjected to hydrolysis to separate the carbonate linkages. Acetic anhydride was added to react with the hydrolyzed fragments. The resulting mixture was subjected to distillation to remove the volatiles, consisting primarily of the diacetate of Bisphenol A. The acetylated ether oligomers remaining in the pot residue were subjected to NMR analysis to determine the ratio of Bisphenol K to Bisphenol A remaining in a polymer unit. The results suggest that Bisphenol K ether blocks of approximately 5 units in length were formed and were connected to the poly(Bisphenol A carbonate) segments through an ether linkage. This was true for both the poly(Bisphenol K ether) and poly(Bisphenol A carbonate) polymer made in accordance with Example 1 and made in accordance with Example 2, the former being made from a random copolycarbonate and the latter being made from an alternating copolycarbonate. Thus, the ratio of residual Bisphenol K/Bisphenol A was 4.75 to 1 in the case of the Example 2 polymer and was 4.84 to 1 in the case of Example 1 polymer.

A similar series of tests was conducted in Examples 4-6 on a 50/50 Bisphenol A/Bisphenol S [bis-(4-hydroxyphenol)sulfone]copolycarbonate. In Example 4, a random 50/50 Bisphenol A/Bisphenol S copolycarbonate was decarboxylated. In Example 5, an alternating 50/50 Bisphenol A/Bisphenol S copolycarbonate was decarboxylated. In Example 6, a sample of the polymer product of Example 5 was analyzed in a manner similar to the procedure of Example 3, except that the final separation technique was modified given the different characteristics of the chemicals involved. The Bisphenol S to Bisphenol A ratio determined by NMR procedures was 5 to 1, again suggesting a poly(Bisphenol S ether) chain length of 5 units joined to the poly(Bisphenol A carbonate) chains through an ether linkage at one end.

The length of the polymer segments can be controlled to some extent by varying reaction conditions to thereby vary the decarboxylation rate difference between the —A—O—CO—O—A— carbonates and the —A—O—CO—O—B— carbonate groups. The specific process steps varied may be different for different copolycarbonates However, varying temperature usually affects the aforesaid rate differential and thereby affects the length of the polymer segments.

The examples which follow are intended solely to illustrate the embodiments of this invention and are not intended in any way to limit the scope and intent of the invention.

EXAMPLE 1

Decarboxylation of Random 50/50 Bisphenol A/Bisphenol K Copolycarbonate

A random copolycarbonate was prepared by dissolving an equimolar ratio of Bisphenol A and Bisphenol K and 0.5 mole percent p-tert-butyl phenol as capping agent in $Ch_2Cl_2$ along with a 20% molar excess of pyridine and a slight excess of phosgene. Ice bath cooling was employed to maintain a temperature below 20°

C. Excess phosgene was destroyed with MeOH. The viscous solution was washed with 1M HCl and water, followed by passage through a column of acidic ion exchange beads to dry the solution and remove any residual pyridine The polymer was isolated by precipitation into hexane/acetone, followed by filtration and drying in a vacuum oven. The inherent viscosity was found to be 0.98dL/g (0.5g/dL CH$_2$Cl$_2$ at 25° C).

The above polymer (15.00g) was placed in a small glass resin kettle along with diphenylsulfone (36.00g) and chlorobenzene (50 mL). The resin kettle was equipped with a capillary gas inlet, a short path distiller and a glass stirring paddle. Heat was provided by a molten salt bath. Nitrogen (40 mL/min) was passed through the gas inlet and out the receiver of the still head. Carbon dioxide was trapped using a tube of 'Ascarite-II' on a sensitive balance. Residual water was removed by twice distilling off 50 mL chlorobenzene. The catalyst (60.0 mg CsF) was then added and the resin kettle was immersed in a preheated 250° C. salt bath. The color changed from a very pale yellow to red, and CO$_2$ began to evolve after a 10 minute induction period.

After 419 minutes, 1.3096 g of CO$_2$ had evolved. Methyl chloride (40 mL/min) was added to the nitrogen inlet gas to cap the polymer. After 10 additional minutes, the reaction was removed from the salt bath. The polymer was removed from the resin kettle and broken up into small pieces while it was still hot. The polymer was slurried in 150 mL CH$_2$Cl$_2$ plus 2 mL Ac$_2$O overnight. This slurry was blended for 5 minutes and added to 250 mL acetone in a blender. The acetone allows the polymer to be filtered more easily. The polymer was then slurried with 300 mL 50% (v/v) acetone/water for 4 hours and filtered. The light tan product was dried overnight in a vacuum oven at 140° C.

A tough, crystalline film was obtained by compression molding at 330° C pressing at 345° C resulted in a tough, amorphous film which was annealed at 285° C. for 30 minutes to a crystalline film. Differential scanning calorimetric analysis on the 345° C molding showed a glass transition temperature of 155° C, an exothermic crystallization peak maximum at 235° C, followed by melting endotherm at 338° C. Integration of the latter peak gave 21J/g which represents 16% crystallinity, assuming a 130J/g heat of fusion which has been determined for poly(ether ether ketone) (D. J. Blundell and B. N. Osborn, Polymer, Vol. 24, p. 953 [1983]).

EXAMPLE 2

Decarboxylation of Alternating Bisphenol A/Bisphenol K Copolycarbonate

An alternating copolycarbonate was prepared using the method described in Example 1, with the exception that the Bisphenol K and 4-t-butylphenol capping agent (2 mole percent) were added after treating the Bisphenol A with phosgene to convert it to the bis-chloroformate. $^{13}$C NMR was used to confirm the alternating structure. The inherent viscosity was determined to be 0.59 dL/g (0.5 g/dL in CH$_2$Cl$_2$ at 25° C).

The decarboxylation was conducted as in Example 1 using 10.00 g polymer, 10.00 g diphenylsulfone and 67.5 mg CsF. After 72 minutes, 623 mg of CO$_2$ had evolved. The reaction was stopped and worked up as in Example 1.

EXAMPLE 3

Analysis of Decarboxylated Bisphenol A/Bisphenol K Copolycarbonate

A portion of the alternating copolycarbonate from Example 2 (2.5755 g) was suspended in CH$_2$Cl$_2$(30 mL) plus MeOH (30 mL) and treated with KOH (1.95 g) at ambient temperature under an N$_2$ atmosphere overnight. The next day the white suspension was acidified to pH 5 with 6M HCl and evaporated. Acetic anhydride (15 mL) plus 3 drops pyridine was added and the suspension was refluxed for 5 minutes. After evaporation to remove excess acetic anhydride, the volatiles (1.51 g consisting of the diacetate of Bisphenol A, a small amount of diphenylsulfone and traces of the diacetate of Bisphenol K) were removed using bulb to bulb distillation. The acetylated ether oligomers remained in the pot residue (1.4595 g). This material was dissolved in refluxing Cl$_2$CHCHCl$_2$ (slight amount of insolubles) and analyzed by $^1$H NMR at 100° C. The ratio of Bisphenol K/Bisphenol A was determined to be 4.75 to 1.00 and the number average molecular weight was 780 g/mole.

A similar analysis of a polymer from decarboxylation of random 50/50 Bisphenol K/Bisphenol A copolycarbonates has been performed to yield number average molecular weight of the ether blocks of 1279 g/mol and a Bisphenol K/Bisphenol A ratio of 4.84:1.00.

EXAMPLE 4

Decarboxylation of Random 50/50 Bisphenol A/Bisphenol S Copolycarbonate

A random copolycarbonate was prepared from an equimolar ratio of Bisphenol A and Bisphenol S plus 1.5 mole percent p-tert-butyl phenol as capping agent as described in Example 1. The inherent viscosity was found to be 0.52 dL/g (0.5 g/dL CH$_2$Cl$_2$ at 25° C).

The method described in Example 1 was used to decarboxylate this copolycarbonate The above polymer (25.00 g) was placed in a small glass resin kettle along with diphenylsulfone (25.00 g) and toluene (100 mL). Residual water was removed by distilling off the toluene. The catalyst (134.8 mg CsF) was then added and the resin kettle was immersed in a preheated 250° C salt bath. The color changed from a very pale yellow to red, and CO$_2$ began to evolve after an 8 minute induction period.

After 190 minutes, 1.9980 g of CO$_2$ had evolved. The polymer dissolved in 100 mL Cl$_2$CHCHCl$_2$ after overnight stirring. This solution was washed twice with 50 mL deionized water. Each washing required more than an hour for phase separation. The polymer was precipitated in 1 L MeOH in a blender. Filter and wash twice with 100 mL MeOH and twice with 100 mL hexane. Dry at 150° C. in a vacuum oven overnight. The inherent viscosity was found to be 0.93 dL/g (0.5g/dL Cl$_2$CHCHCl$_2$ at 25° C).

A tough, clear, colorless film prepared by compression molding at 270° C. Differential scanning calorimetric analysis on this molding showed a glass transition temperature of 165° C.

EXAMPLE 5

Decarboxylation of Alternating Bisphenol A/Bisphenol S Copolycarbonate

An alternating copolycarbonate of Bisphenol A and Bisphenol S was prepared by condensing the bis-chloroformate of Bisphenol A (Preparative Methods in Polymer Chem., Sorenson and Campbell p. 128, 25.000 g, 71.598mmol) with Bisphenol S (17.832 g, 71.24 mmol) plus 4-t-butylphenol (0.1076 g, 0.716 mmol) in $CH_2Cl_2$ (150mL) in the presence of excess pyridine (12.66g, 160mmol). $^{13}C$ NMR was used to confirm the alternating structure. The inherent viscosity was determined to be 0.40 dL/g (0.5 g/dL in $Cl_2CHCHCl_2$ at 25° C).

The decarboxylation was conducted as in Example 1 using 10.00 g polymer, 10.00 g diphenyl sulfone and 96.0 mg CsF. After 128 minutes, 539.4 mg of $CO_2$ had evolved. The reaction was stopped and worked up as in Example 4. The inherent viscosity of the product was 0.66 dL/g (0.5 g/dL in $Cl_2CHCHCl_2$ at 25° C).

EXAMPLE 6

Analysis of Decarboxylated Bisphenol A/Bisphenol S Copolycarbonate

A portion of the alternating copolycarbonate from Example 5 (1.717 g) was suspended in $CH_2Cl_2$ (12 mL) plus MeOH (12 mL) and treated with KOH (1.26 g) at ambient temperature under an $N_2$ atmosphere overnight. The next day a viscous gel had formed which was acidified to pH 5 with 6 M HCl. The white suspension was filtered and evaporated. The residue was washed with acetone, leaving behind a small amount of insolubles. The acetone solution was evaporated and placed under vacuum overnight (1.2729 g). This solid was washed four times with 25 mL boiling deionized water to remove Bisphenol A and Bisphenol S. The insoluble material was acetylated by brief boiling with acetic anhydride. The resultant amber solution was placed under vacuum and gently warmed until a constant weight (623mg) was obtained.

This material was dissolved in $CDCl_3$ and analyzed by $^1H$ NMR. The ratio of Bisphenol S/Bisphenol A was determined to be 5 0 to 1.0 and the number average molecular weight was 1490 g/mole.

In view of the above description, those of ordinary skill in the art may envision various modifications which would not depart from the inventive concepts disclosed. It is, therefore, expressly intended that the above description should be considered as only that of the preferred embodiments.

The embodiments of the invention in which an exclusive property or privilege is claimed are defined as follows.

1. A method for making poly(aryl ether)-poly(aryl carbonate) block copolymers comprising:
   heating a copolycarbonate recurring containing units having the structure:

[—AO—CO—O—] and [—B—O—CO—O—], wherein A is an activating aromatic radical having at least one electron-withdrawing group located in a position ortho or para to its carbonate linking group, and B is a nonactivating aromatic radical which is characterized by the absence of an electron-withdrawing group located in a position ortho or para to its carbonate linking group; in the presence of at least on decarboxylation catalyst at an elevated temperature for a time sufficient to decarboxylate said copolymer to form a poly(aryl ether) poly(aryl carbonate) copolyer containing recurring units having the structure

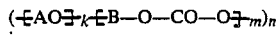

wherein A and B are as previously described, k represents the number of recurring poly(aryl ether) units in the poly(aryl ether) block, m represents the number of recurring poly(aryl carbonate) units in the poly(aryl carbonate) block and n represents the overall degree of polymerization 2. The method of claim 1 which includes decarboxylating a copolycarbonate wherein from about 20 to about 80% of the copolymeric units comprise said activating aromatic carbonate units.

3. The method of claim 2 in which said decarboxylation is continued until at least 10% of the total carbonate linking units in said copolycarbonate are decarboxylated.

4. The method of claim 3 in which said decarboxylation is continued until the decarboxylation of carbonate groups attached to activating aromatic radicals approaches 100%, thereby maximizing the chain length of block segments in the product copolymer.

5. The method of claim 3 in which the chain length of block segments is controlled by varying process parameters in such a way as to vary the difference between the rate of decarboxylation of carbonate groups located between two activating aromatic radicals and carbonate groups located between an activating aromatic radical and a nonactivating aromatic radical.

6. The method of claim 3 in which said electron-withdrawing group is located in a position para to its carbonate linking group.

7. The method of claim 6 in which said aromatic radical is a diaryl aromatic radical.

8. The method of claim 6 in which said copolycarbonate is a random copolycarbonate.

9. The method of claim 6 in which said copolycarbonate is an ordered copolycarbonate.

10. The method of claim 3 in which said copolycarbonate comprises a Bisphenol K/Bisphenol A copolycarbonate.

11. The method of claim 3 in which said copolycarbonate comprises a Bisphenol S/Bisphenol A copolycarbonate.

12. The method of claim 1 in which said electron-withdrawing group is located in a position para to its carbonate linking group.

13. The method of claim 12 in which said aromatic radical is a diaryl aromatic radical.

14. The method of claim 1 in which said copolycarbonate is a random copolycarbonate.

15. The method of claim 1 in which said copolycarbonate is an ordered copolycarbonate.

16. The method of claim 1 in which said copolycarbonate comprises a Bisphenol K/Bisphenol A copolycarbonate.

17. The method of claim 1 in which said copolycarbonate comprises a Bisphenol S/Bisphenol A copolycarbonate.

18. The method of claim 1 wherein said poly(aryl ether)-poly(aryl carbonate) copolymer contains recurring units having the structure

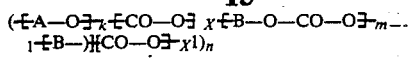

wherein A is an activating aromatic radical having at least one electron-withdrawing group located in a position ortho or para to its carbonate linking group, B characterized by the absence of an electron-withdrawing group located in a position ortho or para to its carbonate linking group, k represents the number of recurring poly(aryl ether) units in the poly(aryl ether) block, m represents the number of recurring units in the poly(aryl carbonate) blocks, n represents the overall degree of polymerization, X is a number which is less than and never equal to 1 and $X^1$ is a number between 0 and 1.

19. The product of claim 18 comprising decarboxylating a copolymer wherein from 20 to 80% of the polymeric units comprise activating aromatic carbonate units.

20. The method of claim 19 wherein said decarboxylation is continued until at least 10% of the total carbonate linking units in said copolycarbonate are decarboxylated.

21. The method of claim 20 wherein said decarboxylation is continued until the decarboxylation of carbonate groups attached to activating aromatic radicals approaches 100%.

22. The method of claim 1 wherein said electron-withdrawing group comprises at least one of $—SO_2—$, $—SO—$, $—CO—$, $—CONH—$, $—CONR—$, $—^+NR_2—$, $—^+PR_2—$, $—^+SR—$, $—P(O)R—$, $—C(CF_3)_2—$, $—CHCH—$, $—NN—$, $—CHNNCH—$, $—CN$, $—NO_2$, $—CHO$, $—CO_2R$, $—CO_2NN_2$, $—P(O)(OR)_2$, $—P(O)R_2$, $—^+PR_3$, $—^+NR_3$, $—^+SR_2$, an imidazole, oxazole, pyrazole, isoxazole and oxapyrazole, wherein R is a difunctional or monofunctional hydrocarbyl radical having from one to 12 carbon atoms.

23. The method of claim 22 wherein from 20 to 80% of the polymeric units of said copolymer comprise activating aromatic carbonate units.

24. The method of claim 23 wherein said decarboxylation is continued until at least 10% of the total carbonate linking units in said copolycarbonate are decarboxylated.

25. The method of claim 24 wherein said decarboxylation is continued until the decarboxylation of carbonate groups attached to activating aromatic radicals approaches 100%.

26. The method of claim 22 wherein said poly(aryl ether)-poly(aryl carbonate) copolymer contains recurring units having the structure

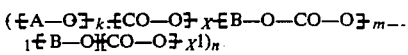

wherein A is an activating aromatic radical having at least one electron-withdrawing group located in a position ortho or para to its carbonate linking group, B is a nonactivating aromatic radical which is characterized by the absence of an electron-withdrawing group located in a position ortho or para to its carbonate linking group, k represents the number of recurring poly(aryl ether) units in the poly(aryl ether) block, m represents the number of recurring units in the poly(aryl carbonate) blocks, n represents the overall degree of polymerization, X is a number which is less than and never equal to 1 and $X^1$ is a number between 0 and 1.

27. The method of claim 26 wherein from 20 to 80% of the polymeric units of said copolymer comprise activating aromatic carbonate units.

28. The method of claim 27 wherein said decarboxylation is continued until at least 10% of the total carbonate linking units in said copolycarbonate are decarboxylated.

29. The method of claim 28 wherein said decarboxylation is continued until the decarboxylation of carbonate groups attached to activating aromatic radicals approaches 100%.

* * * * *